UNITED STATES PATENT OFFICE.

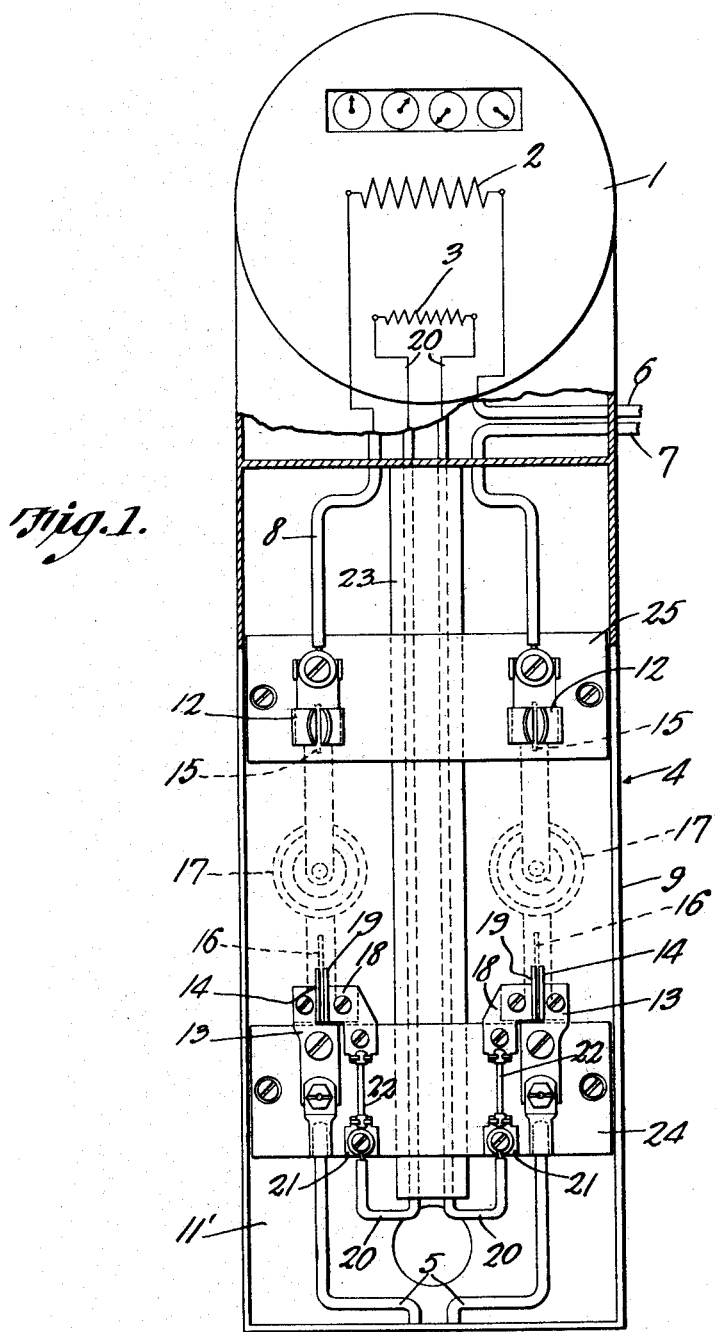

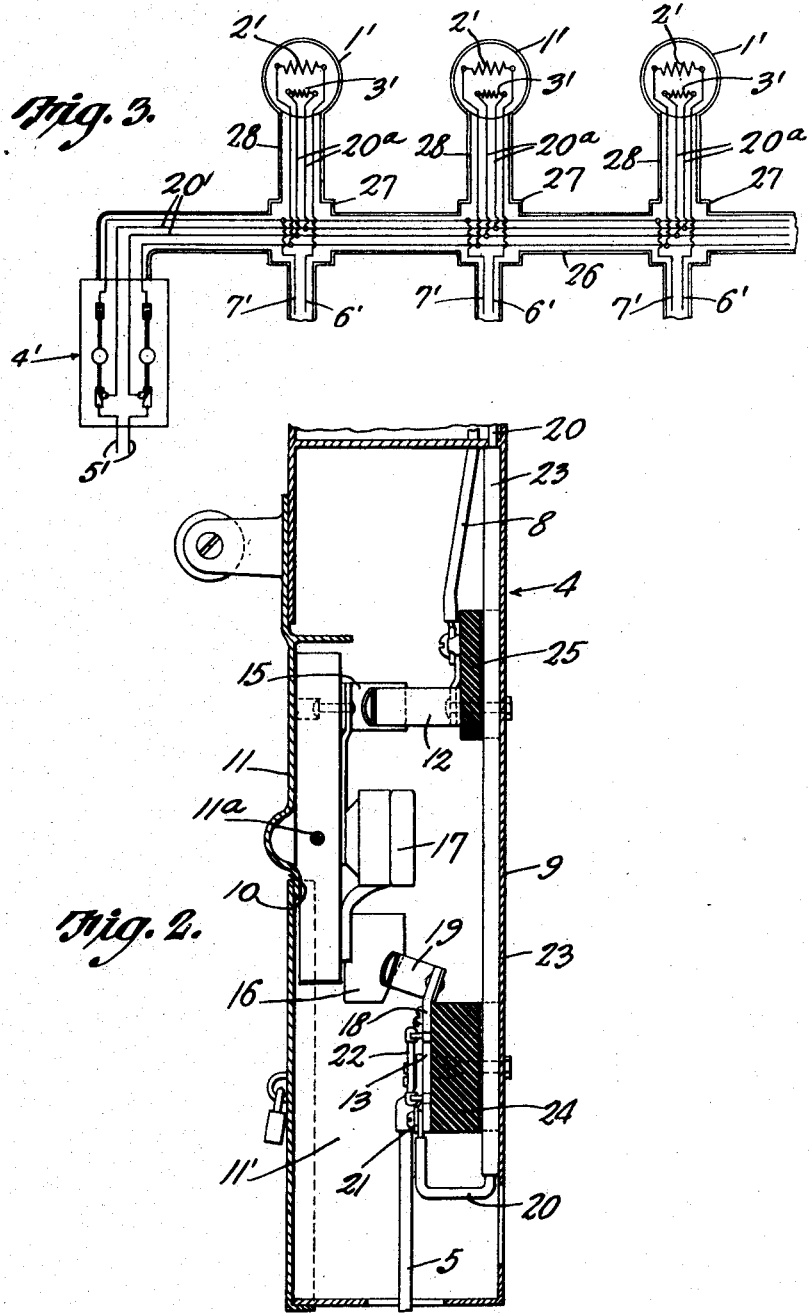

ALFRED W. BULL, OF BALTIMORE, MARYLAND.

SERVICE-SWITCH AND WIRING FOR ELECTRIC METERS.

1,202,478.   Specification of Letters Patent.   Patented Oct. 24, 1916.

Application filed June 14, 1915. Serial No. 34,087.

*To all whom it may concern:*

Be it known that I, ALFRED W. BULL, a citizen of the United States, residing at Baltimore, in the State of Maryland, have invented a new and useful Service-Switch and Wiring for Electric Meters, of which the following is a specification.

The present invention appertains to a service switch and wiring for electric meters, and aims to provide novel and improved means for connecting the potential coil of an electric meter to the line wires or conductors, whereby it is impossible for the meter to be stopped when current is traversing the load wires.

It is not infrequently the case, that consumers using electricity for lighting or other purposes, tamper with the fuses, meter connections, and the like, so as to cut off the current through the potential coil of the meters, whereby the current consumed will not be registered. Various means are employed for beating electric meters as they are now wired or connected to the line wires, and numerous attempts have been made to remedy the conditions, whereby the meters could not be stopped by unwarranted or maliciously inclined persons, but to no avail.

This invention has for its primary object the provision of means for connecting the potential coil of an electric meter to the line wires, whereby current will always flow through the potential coil, when any current passes through the load wires.

It is also within the scope of the invention, to carry out the above object in a simple, inexpensive, practical and efficient manner, and so that the improved features may be embodied in prevailing electric meters and service switches without entailing prohibitive trouble or expense.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is an elevation of a common service switch embodying the improvements, the meter being illustrated diagrammatically, and the front wall of the switch being removed. Fig. 2 is a longitudinal section of the service switch embodying the improvements. Fig. 3 is a diagrammatical view of a plurality of meters connected to the service switch in accordance with the present invention.

In the drawings, the numeral 1 designates an ordinary electric meter having the current coil 2, and the potential coil 3, as usual.

The numeral 4 designates a prevailing or common type of service switch which is now in use, but containing certain additional elements whereby the switch is adapted for the present invention.

The line wires or conductors are designated by the numerals 5, and one load wire or conductor is designated by the numeral 6, while the other load wire is designated by the numeral 7. The load wire 6 is connected to one end of the current coil 2 of the meter, while the other end of the current coil 2 is connected by means of a wire or conductor 8 to the switch 4. The other load wire 7 is also connected to the switch 4.

The switch 4 embodies a casing 9 whose front wall is provided with an opening 10, and a door 11 is pivoted between its ends, as at 11ª, to the side walls of the casing 9 whereby one end portion of the door 11 is arranged to swing outwardly for opening the casing 9, while the other end portion is arranged to swing across the casing to prevent access being had into the live terminal chamber 11′ within the casing 9. A pair of contacts 12 are mounted within the casing 9 and the respective ends of the wires 7 and 8 are connected thereto. Live terminal members 13 are mounted within the live terminal chamber 11′ of the casing 9, so as to be inaccessible from the outside, even though the door 11 is swung open and the elements 13 are each provided with a contact 14. The line wires 5 are connected to the elements 13. The switch proper is carried by the door 11, and embodies a pair of blades 15 engageable with the contacts 12, and a pair of blades 16 engageable with the contacts 14, the blades 15 and 16 of the two pairs being electrically connected, and removable main fuses 17 are interposed between the blades, whereby when the fuses are burnt out, the door 11 may be opened by the consumer or customer, for replacing the fuses. When the door 11 is swung open, the blades 15 and 16 are swung out of engagement with the respective contacts 12 and 14, to open the circuit.

In carrying out the invention, a potential coil 3 of the meter 1 is provided with separate potential terminals, which are connected to the line wires 5 ahead of the main fuses 17. As an effective means of carrying out this result, terminal elements 18 are mounted within the chamber 11′ of the switch casing 9, adjacent, but insulated from the terminal elements 13, and the elements 18 are provided with contacts 19 arranged adjacent, but spaced from, the contacts 14, whereby when the door 11 is closed, the blades 16 will wedge tightly between the respective contacts 14 and 19. Wires 20 connect elements 21 and the terminals of the potential coil 3, the elements 21 being mounted within the chamber 11′ of the casing 9, and suitable fuses 22 being preferably disposed between the elements 18 and 21. The potential shunt thus formed is connected to the line wires ahead of the main fuses and the fuses 22 of the potential shunt as well as the terminals of the line wires and potential shunt are protected within the chamber 11′ against tampering. The potential wires are preferably run through a channel member 23 secured to the back of the casing 9, whereby the wires 20 are protected from injury, and it is preferable to also suitably protect the wires 20 between the meter 1 and switch 4. The elements 13, 18 and 21 are mounted upon a block 24 of slate or other insulation mounted within the chamber 11′ of the switch casing 9, and the contacts 12 are mounted upon a similar block 25 attached to the back of the casing 9.

In view of the fact that the potential coil of the meter is connected to the line wires ahead of the main fuses, current will always pass through the potential coil, when the circuit through the load wires 6 and 7 is closed, and the meter will thus properly register the current consumed. It will be noted that when the switch 4 is opened, the blades 16 will disengage the contacts 19 as well as the contacts 14, to open the circuit through the potential coil, when the circuit through the current coil is opened, and this will prevent any current flowing through the meter whenever the service switch 4 is opened. This is desirable or essential under certain conditions, although in other circumstances, this feature need not be employed. With the arrangement illustrated, as soon as the switch 4 is closed, the blades 16 in engaging the contacts 14, will also engage the contacts 19, whereby as soon as the current is free to flow through the current coil 2, the current will also flow through the potential coil 3. The circuits through the potential and current coils, are thus opened and closed simultaneously.

With the present arrangement, it is not practical for the consumer to prevent current passing through the potential coil, without so tampering with the switch or wiring, that the injury will be readily detected. Of course, it is possible by malicious means to cut or otherwise disconnect the potential coil from the line wires, but this can be done in any event, and can be readily detected, so that the usual recourse against the consumer may be had.

It is the chief aim of the present invention to prevent the stopping of the meter by such means which cannot be detected, and which are continually resorted to by maliciously inclined persons.

The type of service switch illustrated has heretofore been manufactured, and is being used, and has been illustrated chiefly for the purpose, to show the simple manner in which the present improvements may be incorporated therein. The present improvements may be incorporated in other types of switches, cut out blocks, and the like, with equal success and propriety, and the present improvements may be employed in connection with various numbers of wires, appropriate and apparent changes being made.

Those meters which do not have separate potential terminals, may be readily provided with such terminals, in order that the potential coils can be properly connected to the line wires in accordance with the present invention. The potential shunt can be, and preferably is, provided with fuses, although these fuses need not be employed, if desired. It is also preferable, but not mandatory in all cases, to have the potential shunt controlled by the main service switch, as illustrated, although this is a desirable and salient feature. Current will flow through the potential coil, whether or not the main fuse is burnt out.

The advantage of having the potential coil connected to the line or service wires ahead of the main fuse is this: Should the customer, either accidentally or maliciously, short circuit the load wires, so as to burn out the fuses, the main fuses only would be burnt out, and not the fuses of the potential shunt. Thus, the customer in replacing the main fuses, cannot use current without the potential coil being energized, and this prevents the theft of current. The advantage of simultaneously connecting the load conductors and potential coil with and for disconnecting them from the line wires resides in the fact that independent switches are eliminated, thus avoiding confusion and possible mistake. When the switch is opened for purpose of fire protection, or the like, the main circuit is not only broken, but also the potential shunt, which is essential due to the connection of the potential shunt with the line wires ahead of the main fuses and switch. Thus, as soon as the switch is operated to open the main circuit, the potential shunt is also opened, and it is impossible to open the potential shunt or main circuit independently, or to close either independent of the other. This is an important arrangement.

The invention may also be incorporated in apartment houses, office buildings, and the like, wherein a number of meters are employed. This is illustrated diagrammatically in Fig. 3, wherein a plurality of meters 1' are illustrated. A single service switch 4' may be employed in connection with all of the meters 1', by connecting the potential wires 20' with the line wires 5' as above described, and connecting the potential wires 20' in multiple to the potential coils 3' of the meters 1'. The leaders 20ª between the potential coils 3' and potential wires 20' may or may not be provided with suitable fuses, and the service switch 4' may be provided with main fuses for the potential wires 20', according to the dictates of necessity. The load wires 6' and 7' of each meter are connected to the current coils 2' and switch 4' in multiple, which is obvious and well known. The connections between the meters 1' and switch 4' are preferably inclosed, to prevent tampering, and to this end the trunks between the meters and switch are inclosed in a suitable conduit 26, which has adapter and testing boxes 27 interposed therein for the respective meters. The boxes 27 are connected to the meters 1' by branches 28 which inclose the wires between the meters and the respective boxes 27. The boxes 27 may be of ordinary construction, whereby they may be opened by the authorized persons for testing the meters, or for purpose of examination and repair.

It is evident that the arrangement illustrated in Fig. 3, embodies the rudiments of the arrangement illustrated in Figs. 1 and 2, and renders it more clear, how the invention can be employed under various conditions. The present improvements may also be embodied under various other conditions, slight changes in details being made, as required, and as will be apparent to those skilled in the art.

Having thus described the invention, what is claimed as new is:

1. In combination, an electric meter having current and potential coils, line wires having terminal contacts, potential wires connected to the potential coil and having terminal contacts, load conductors connected to the current coil, a switch for connecting said conductors and line wires and engageable simultaneously with all of said contacts, main fuses for said conductors, other fuses for the potential wires, and means for concealing all of said contacts and the second mentioned fuses to prevent unwarranted tampering therewith.

2. In combination, a meter having current and potential coils, a switch casing having an opening, a door pivoted to the casing to swing out through said opening, said casing having a live terminal chamber therein which is inaccessible when said door is opened, terminal elements in said chamber having contacts, line wires connected to said terminal elements, second terminal elements within said chamber having contacts arranged adjacent the aforesaid contacts, potential wires connecting the potential coil and the second mentioned terminal elements and having fuses interposed therein within said chamber, conductors extending from within said casing and connected to the current coil, one of said conductors including load wires, and switch means carried by said door and including fuses, said switch means being arranged to connect said conductors and line wires and including blades engageable simultaneously with and disengageable simultaneously from all of the said contacts.

In testimony that I claim the foregoing as my own, I have hereto affixed my signature in the presence of two witnesses.

ALFRED W. BULL.

Witnesses:
JAMES S. CRUIKSHANK,
LOUIS L. HAYDEN.

Copies of this patent may be obtained for five cents each, by addressing the "Commissioner of Patents, Washington, D. C."